US008989774B2

(12) United States Patent
Li

(10) Patent No.: US 8,989,774 B2
(45) Date of Patent: Mar. 24, 2015

(54) METHOD AND SYSTEM OF SEMNATIC INDOOR POSITIONING USING SIGNIFICANT PLACES AS SATELLITES

(71) Applicant: Telefonaktiebolaget L M Ericsson (Publ), Stockholm (SE)

(72) Inventor: Du Li, Palo Alto, CA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 183 days.

(21) Appl. No.: 13/763,298

(22) Filed: Feb. 8, 2013

(65) Prior Publication Data

US 2014/0106773 A1 Apr. 17, 2014

Related U.S. Application Data

(60) Provisional application No. 61/712,741, filed on Oct. 11, 2012.

(51) Int. Cl.
*H04W 24/00* (2009.01)
*H04W 4/04* (2009.01)
(Continued)

(52) U.S. Cl.
CPC . *H04W 4/04* (2013.01); *H04W 4/02* (2013.01); *H04W 4/021* (2013.01); *H04W 4/025* (2013.01); *H04W 4/023* (2013.01); *H04W 64/00* (2013.01); *G01S 5/0278* (2013.01); *H04W 4/043* (2013.01)
USPC .......... 455/456.1; 455/456.2; 455/456.3; 455/456.4; 455/456.5; 455/456.6; 455/457

(58) Field of Classification Search
CPC ....... H04W 88/02; H04W 4/021; H04W 4/04; H04W 64/00
USPC ............................... 455/456.1–457
See application file for complete search history.

(56) References Cited

U.S. PATENT DOCUMENTS 7,647,171 B2 * 1/2010 Horvitz et al. ................ 701/469
2005/0243936 A1 * 11/2005 Agrawala et al. ............. 375/259

(Continued)

FOREIGN PATENT DOCUMENTS

EP 2141957 1/2010
WO WO-0172060 9/2001

OTHER PUBLICATIONS

Li, Du, et al., "A Wi-Fi Based Occupancy Sensing Approach to Smart Energy in Commercial Office Buildings", *Embedded Sensing Systems for Energy-Efficiency in Buildings, ACM*; Nov. 6, 2012; pp. 197-198.

(Continued)

*Primary Examiner* — Charles Appiah
*Assistant Examiner* — Jaime Holliday
(74) *Attorney, Agent, or Firm* — Blakely, Sokoloff, Taylor & Zafman, LLP

(57) ABSTRACT

A method for locating a mobile device inside a building by using a plurality of reference areas in the building as satellites. A scan is obtained by the mobile device at an unknown location in the building. The scan includes a plurality of detected WAPs with a corresponding RSSI for each detected WAP. The method to improve accuracy of a semantic indoor positioning system by generating a vector of distance scores based on the scan for comparison with vectors of survey distance scores corresponding to the reference areas. The method includes arranging the detected WAPs into an ordered list, extracting a set of WAP tuples from the ordered list, retrieving a set of probabilities for each reference area, calculating a distance score for each reference area, generating the vector of distance scores, and comparing the vector of distance scores with each of the vectors of survey distance scores.

18 Claims, 7 Drawing Sheets

(51) Int. Cl.
*H04W 64/00* (2009.01)
*G01S 5/02* (2010.01)
*H04W 4/02* (2009.01)

(56) References Cited

U.S. PATENT DOCUMENTS

| | | | |
|---|---|---|---|
| 2007/0202887 | A1 | 8/2007 | Counts et al. |
| 2011/0018732 | A1* | 1/2011 | Cho et al. ............... 340/825.49 |
| 2011/0287779 | A1 | 11/2011 | Harper |
| 2012/0044355 | A1 | 2/2012 | Jamtgaard et al. |
| 2012/0046044 | A1 | 2/2012 | Jamtgaard et al. |
| 2012/0058782 | A1* | 3/2012 | Li ............................. 455/456.2 |
| 2012/0244875 | A1 | 9/2012 | Cardona et al. |
| 2013/0079031 | A1* | 3/2013 | Kuhn et al. ................ 455/456.1 |
| 2013/0281118 | A1* | 10/2013 | Lipman et al. ............. 455/456.1 |
| 2013/0344888 | A1* | 12/2013 | Dousse ...................... 455/456.1 |

OTHER PUBLICATIONS

Thanayankizil, Lakshmi V., et al., "Softgreen: Towarads Energy Management of Green Office Buildings with Soft Sensors", *COMSNETS, 2012 Fourth International Conf on, IEEE*, Jan. 3, 2012; pp. 1-6.

Youssef, Moustafa , et al., "The Horus location determination system", *Wireless Networks; The Journal of Mobile Communication, Computation and Information*; vol. 14, No. 3; Jan. 4, 2007; pp. 357-374.

Agarwal, Y, et al., "Duty-cycling buildings aggresively: The next frontier in HVAC control", *Information Processing in Sensor Networks (IPSN), 2011 10th International Conference on*, IEEE, (2011), 258-269.

Bahl, P, et al., "RADAR: An in-building RF-based user locaiton and tracking system", *Proceedings of IEEE Infocom Conference*, (2000).

Emmerich, Steven J., et al., "State-of-the-Art Review of CO2 Demand Controlled Ventilation Technology and Application", *US Dept of Commerce, National Institute of Standars and Technology*, Gaithersburg, (2001), 47 Pages.

Erickson, V, et al., "OBSERVE: Occupancy-based system for efficient reduction of HVAC energy", *Information Processing in Sensor Networks (IPSN), 2011 10th annual international conference on Mobile computing and networking (MobiCom '04)*, ACM, New York, NY, USA, (2011), 70-84.

Ghai, Sunji K., et al., "Occupancy Detection in Commercial Buildings using Opportunistic Context Sources", *Work in Progress session at IEEE PerCom conference*, (Mar. 2012).

Haeberlen, Andreas , et al., "Practical Robust Localization over Large-Scale 802.11 Wireless Networks", *Proceedings of the 10th annual international conference on Mobile computing and networking (MobiCom '04)*, ACM, New York, NY, USA, (2004), 70-84.

Jiang, Yife , et al., "MAQS: a mobile sensing system for indoor air quality", *Proceedings of the 13th international conference on Ubiquitous computing (UbiComp '11)*, ACM, New York, NY, USA, (2011), 493-494.

King, Thomas, et al., "A Location System based on Sensor Fusion: Research Areas and Software Architecture", *University of Mannheim*, (May 19, 2005), 33 Pages.

Madigan, David, et al., "Bayesian Indoor Positioning Systems", *Proceedings of IEEE Infocom*, Miami, Florida, (Mar. 2005).

Martani, Claudio, et al., "ENERNET: Studying the dynamic relationship between building occupancy and energy consumption", *Energy Buildings*, doi:10.1016/j.enbuilding.2011.12.037, (2012).

Tarzia, et al., "Sonar-based measurement of user presence and attention". *Proceeding of ACM Ubicomp conference* (2009), 4 pages.

Thanayankizil, L, et al., "Softgree: Towards energy management of green office buildings with soft sensors", *Energy in communications, Information, and Cyber-physical Systems (E6) Workshop, Comsnets*, IEEE, (2012).

* cited by examiner

METHOD AND SYSTEM OF SEMNATIC INDOOR POSITIONING USING SIGNIFICANT PLACES AS SATELLITES

CROSS-REFERENCE TO RELATED APPLICATIONS

This application claims the benefit of U.S. Provisional Application No. 61/712,741, filed Oct. 11, 2012, which is hereby incorporated by reference.

FIELD OF THE INVENTION

The embodiments of the invention relate to the field of indoor positioning. Specifically, the embodiments relate to leveraging collected semantics regarding areas inside a building to find the most probable area that a user is located in.

BACKGROUND

While Global Positioning System (GPS) and Assisted Global Positioning System (A-GPS) technologies work very well for determining the location of a user outdoors, they are not reliable indoors because these technologies require an unobstructed line of sight to multiple satellites. Indoor positioning systems (IPSs) have been developed to solve this problem by utilizing networks and wireless devices to determine the locations of users inside a building. IPS technologies can be used in a variety of applications, including indoor navigation and occupancy sensing for building automation systems.

Some methods for implementing IPSs utilize radio frequency identification (RFID) or BLUETOOTH technologies. In the RFID approach, the user carries a passive or active RFID tag (e.g., embedded in his badge). Furthermore, RFID readers are installed at areas of interest in the building, such as rooms and cubicles, to read the tag information and determine which user is nearby. Similarly, in the BLUETOOTH approach, BLUETOOTH sensor nodes are deployed at areas of interest in the building and the user carries another BLUETOOTH sensor, such as a mobile device. The BLUETOOTH sensor carried by the user and the deployed sensor nodes can detect each and report the location of the user.

It is also possible to use cellular or Wi-Fi based distance approaches for determining the location of an indoor mobile device. These approaches estimate the physical distances between the mobile device and wireless access points (such as cellular base stations and Wi-Fi access points) by means such as received signal strength indication (RSSI), time of arrival (TOA), angle of arrival (AOA), and time difference of arrival (TDOA). Triangulation or trilateration techniques can then be used to estimate the location of the mobile device based on the estimated distances.

SUMMARY

In one embodiment, a method is executed by a computer system implementing a semantic indoor positioning system to locate a mobile device inside a building by using a plurality of reference areas as satellites. The building includes the plurality of reference areas. A scan of a plurality of wireless radio signals is obtained by the mobile device of a user at an unknown location in the building. The plurality of wireless radio signals is generated by a plurality of wireless access points (WAPs). The scan includes a plurality of detected WAPs with a corresponding received signal strength indication (RSSI) for each detected WAP in the plurality of detected WAPs. The method to improve accuracy of the semantic indoor positioning system by generating a vector of distance scores for the unknown location based on the scan for comparison with a plurality of vectors of survey distance scores corresponding to the plurality of reference areas. The method includes arranging the plurality of detected WAPs into an ordered list of WAPs according to the corresponding RSSI for each detected WAP in the plurality of detected WAPs. A set of WAP tuples is extracted from the ordered list of WAPs, each WAP tuple including a preset number of adjacent WAPs from the ordered list. A set of probabilities for each reference area is retrieved based on the set of WAP tuples, each probability in the set of probabilities for a corresponding reference area being calculated from a plurality of survey scans obtained at the corresponding reference area. A plurality of distance scores for the plurality of reference areas is calculated, each distance score being calculated by applying a Bayesian model to the retrieved set of probabilities for the corresponding reference area. The vector of distance scores for the unknown location is generated using each reference area in the plurality of reference areas as a direction and each distance score in the plurality of distance scores as a magnitude. The vector of distance scores for the unknown location is compared with each of the plurality of vectors of survey distance scores to find the reference area that has a highest probability of including the unknown location.

In another embodiment, a computer system implements a semantic indoor positioning system to locate a mobile device inside a building by using a plurality of reference areas as satellites. The building includes the plurality of reference areas. A scan of a plurality of wireless radio signals is obtained by the mobile device of a user at an unknown location in the building. The plurality of wireless radio signals is generated by a plurality of wireless access points (WAPs). The scan includes a plurality of detected WAPs with a corresponding received signal strength indication (RSSI) for each detected WAP in the plurality of detected WAPs. The computer system to improve accuracy of the semantic indoor positioning system by generating a vector of distance scores for the unknown location based on the scan for comparison with a plurality of vectors of survey distance scores corresponding to the plurality of reference areas. The computer system comprises a storage device configured to store a probability table storage and a vector storage, and a computer processor coupled to the storage device and configured to execute a positioning module.

The probability table storage is configured to store a plurality of probability tables corresponding to the plurality of reference areas, each probability in a probability table being calculated from a plurality of survey scans obtained at a corresponding reference area. The vector storage is configured to store the plurality of vectors of survey distance scores.

The positioning module is configured to arrange the plurality of detected WAPs into an ordered list of WAPs according to the corresponding RSSI for each detected WAP in the plurality of detected WAPs, and to extract a set of WAP tuples from the ordered list of WAPs, where each WAP tuple in the set of WAP tuples including a preset number of adjacent WAPs from the ordered list. The positioning module is further configured to retrieve a set of probabilities from the probability table storage for each reference area in the plurality of reference areas based on the set of WAP tuples, and to calculate a plurality of distance scores for the plurality of reference areas, where each distance score in the plurality of distance scores being calculated by applying a Bayesian model to the retrieved set of probabilities for the corresponding reference area. The positioning module is further configured to generate the vector of distance scores for the unknown location using each reference area in the plurality of reference areas as a direction and each distance score in the plurality of distance scores as a magnitude, and to compare the vector of distance scores for the unknown location with each of the plurality of vectors of survey distance scores to find the reference area that has a highest probability of including the unknown location.

BRIEF DESCRIPTION OF THE DRAWINGS

The present invention is illustrated by way of example, and not by way of limitation, in the figures of the accompanying drawings in which like references indicate similar elements. It should be noted that different references to an or one embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
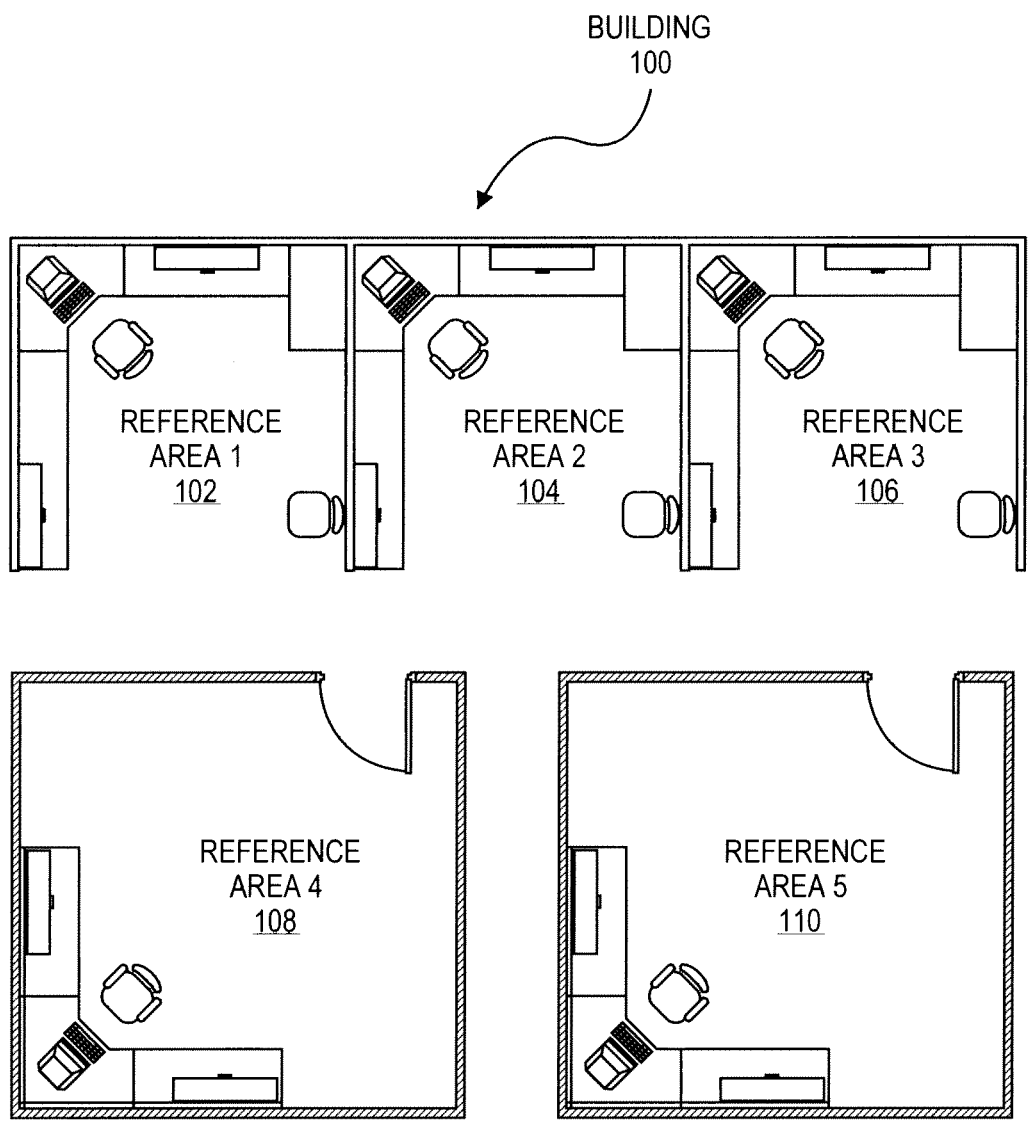
FIG. 1 is a diagram of an exemplary building that includes a plurality of reference areas in which one embodiment of a semantic indoor positioning process that uses the plurality of reference areas as satellites can be implemented.

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To facilitate understanding of the embodiments, dashed lines have been used in the figures to signify the optional nature of certain items (e.g., features not supported by a given embodiment of the invention; features supported by a given embodiment, but used in some situations and not in others).

The techniques shown in the figures can be implemented using code and data stored and executed on one or more electronic devices. An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices includes hardware such as a set of one or more processors coupled to one or more other components, such as one or more non-transitory machine-readable media (to store code and/or data), user input/output devices (e.g., a keyboard, a touchscreen, and/or a display), and network connections (to transmit code and/or data using propagating signals). The coupling of the set of processors and other components is typically through one or more busses and bridges (also termed as bus controllers). Thus, a non-transitory machine-readable medium of a given electronic device typically stores instructions for execution on one or more processors of that electronic device. One or more parts of an embodiment of the invention may be implemented using different combinations of software, firmware, and/or hardware.

As used herein, a network element (e.g., a router, switch, bridge) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smart phones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

The embodiments of the invention described herein below provide a method and system for implementing a semantic indoor positioning system (IPS) inside a building. The indoor space of the building is divided into a number of reference areas (e.g., in terms of rooms and cubicles that are units of actual occupancy). These reference areas resemble "satellites" that can be used to determine the location of a user. Each reference area is fingerprinted, and then the location of the user can be determined from a scan obtained by a mobile device of the user and the fingerprints of the reference areas.

Due to the limited reliability of Global Positioning System (GPS) and Assisted Global Positioning System (A-GPS) technologies when used indoors, several existing IPS approaches have been developed. These IPS approaches can be classified under three general categories: (1) sensor based approaches, (2) distance based approaches, and (3) statistical approaches. However, each of the existing IPS approaches has several disadvantages, including high deployment costs and low accuracy.

In the sensor based approaches, for example, sensors with short-range wireless capabilities (e.g., RFID readers or BLUETOOTH sensor nodes) are deployed at areas of interest throughout a building, such as rooms and cubicles. A user carries a mobile device that is capable of communicating with the sensors (e.g., a passive or active RFID tag embedded in a badge or a BLUETOOTH enabled cell phone), and the location of the user can be determined when the mobile device comes within range of one of the sensors. Thus, the accuracy of these sensor based approaches is dependent on the density of the sensors, which implies high deployment costs for accurate and large-scale applications.

Distance based approaches use long-range wireless technologies, such as cellular and Wi-Fi, to determine the location of a user indoors. When a mobile device carried by the user is in communication with a wireless access point (e.g., a cellular base station or a Wi-Fi access point), these approaches measure the physical distance between the mobile device and the wireless access point by means such as received signal strength indication (RSSI), time of arrival (TOA), angle of arrival (AOA) and time difference of arrival (TDOA). If a required number of distance measurements can be simultaneously obtained, the location of the user can be estimated using techniques such as triangulation or trilateration. While these approaches can potentially save on deployment costs by leveraging existing network assets, they are inaccurate by nature because the radio signals used by these approaches to measure distance are very noisy in real-world indoor environments. This is due to complex factors that exist in indoor environments, such as reflection, diffraction and absorption. In addition, the accuracy of each distance measurement is highly dependent on the quality and precision of the equipment. Various factors in the equipment, such as the thermal stability of clocking oscillators, synchronization of the transmitter oscillator with the receiver oscillator, as well as phase synchronization of the transmitted signal with the received signal, all have an impact on the accuracy of the distance measurements.

There are also statistical approaches for implementing an IPS. As with the distance based approaches, the statistical approaches can leverage existing network assets such as cellular base stations and Wi-Fi access points to save on deployment costs. However, the statistical approaches do not rely on distance measurements. Instead, the statistical approaches use a two-step process for determining the location of a user: a fingerprinting step and a positioning step. These statistical approaches are sometimes also referred to as semantic approaches because the location of a user is determined by associating information with areas of interest in the building, during the fingerprinting step.

One statistical approach is an RSSI pattern based approach. To perform the fingerprinting step using this approach, a number of survey scans of wireless radio signals (e.g., cellular signals or Wi-Fi signals) are collected at each area of interest in a building. Each scan returns a set of detected <WAP, RSSI> pairs, where "WAP" represents a wireless access point (WAP) that is generating a wireless radio signal and "RSSI" represents the corresponding received signal strength indication of the signal generated by that WAP. For example, a Wi-Fi scan can return a set of MAC addresses, each MAC address uniquely identify a detected Wi-Fi WAP, and a corresponding RSSI for each MAC address, such as {<01:AE:02:CB:32:45, −50 dBm>, <01:AE:05:3E:E2:D5, −89 dBm>, ... }. In this example, "01:AE:02:CB:32:45" and "01:AE:05:3E:E2:D5" are the MAC addresses of Wi-Fi WAPs, and "−50 dBm" and "−89 dBm" are the corresponding RSSI values for the MAC addresses. After the survey scans are collected, the probability of each <WAP, RSSI> pair is calculated for each area of interest. In the positioning step, a new scan $\{w_1, w_2, \ldots, w_i\}$, each w representing a <WAP, RSSI> pair, is obtained from an unknown location. Then, the area that has the highest probability of including the unknown location can be found using the following formula:

$$\hat{r} = \arg\max_{r \in R}\left[\prod_i P(w_i \mid r)P(r)\right]$$

Note that two assumptions are made in the above formula: (1) all the WAPs are independent, and (2) the RSSI values vary at different locations.

Although the RSSI pattern based statistical approach is generally more accurate than the distance based approaches, the accuracy for differentiating between two nearby areas is still low in noisy indoor environments. This is because the measured RSSI values can be inconsistent in noisy indoor environments.

The other statistical approach is a subsequence pattern based approach. In this approach, after the survey scans are collected at each area of interest in a building, the detected WAPs in each scan are arranged into an ordered list according to their respective RSSI values. Then, instead of calculating the probability of each <WAP, RSSI> pair as the RSSI pattern based approach does, the probability of each n-tuple that appears in the ordered list is calculated. A tuple is a two or more WAPs that appear adjacent to each other in the ordered list, and "n" denotes the number of WAPs that the tuple contains. For example, an ordered list of detected WAPs can look like the following: {<A, −50>, <B, −60>, <C, −65>}. Under this example, if 2-tuples were used, then the probability of the 2-tuples <A, B> and <B, C> would be calculated during the fingerprinting step. Alternatively, if 3-tuples were used, then the probability of the 3-tuple <A, B, C> would be calculated. Then, to determine the location of a new scan, the new scan is also arranged into an ordered list and the area that has the highest probability of including the location of the new scan can be determined using the following formula:

$$\hat{r} = \arg\max_{r \in R}\left[\prod_i P(ntuple_i(s) \mid r)P(r)\right]$$

The subsequence pattern based statistical approach is more accurate than the RSSI pattern based statistical approach because the order of WAP sequence is more consistent in noisy environments than the RSSI values. The subsequence patterns capture the concept of co-occurrence rate of WAPs. However, in experiments, while the subsequence pattern based approach can differentiate between wall-separated rooms with over 90% accuracy, it still showed random results in partially-enclosed cubicle environments, which is typical in commercial office buildings.

The embodiments of the present invention overcome the disadvantages of the prior art by using the fingerprinted areas as reference areas. During the fingerprinting step, distance scores are calculated between reference areas, and a vector of survey distance scores is generated for each reference area based on the calculated distance scores. Then, in the positioning step, a distance score is calculated for each reference area using a scan obtained at an unknown location, and a vector of distance scores is generated for the unknown location using the distance scores. This vector for the unknown location can then be compared with the vectors of survey distance scores for the reference areas to find a reference area that has the highest probability of including the unknown location. The advantages of the embodiments described herein include lower deployment costs since existing network assets can be leveraged. Furthermore, accuracy is improved because the distance scores are more robust and more stable than the RSSI patterns used in the RSSI pattern based approach and the tuples used in the subsequence pattern based approach.

FIG. 1 is a diagram of an exemplary building that includes a plurality of reference areas in which one embodiment of a semantic indoor positioning process that uses the plurality of reference areas as satellites can be implemented. Building 100 includes five reference areas 102-110. A building can have two or more reference areas defined to take advantage of the embodiments described herein below, which are supplemented with examples that refer back to FIG. 1.

Figure 2:
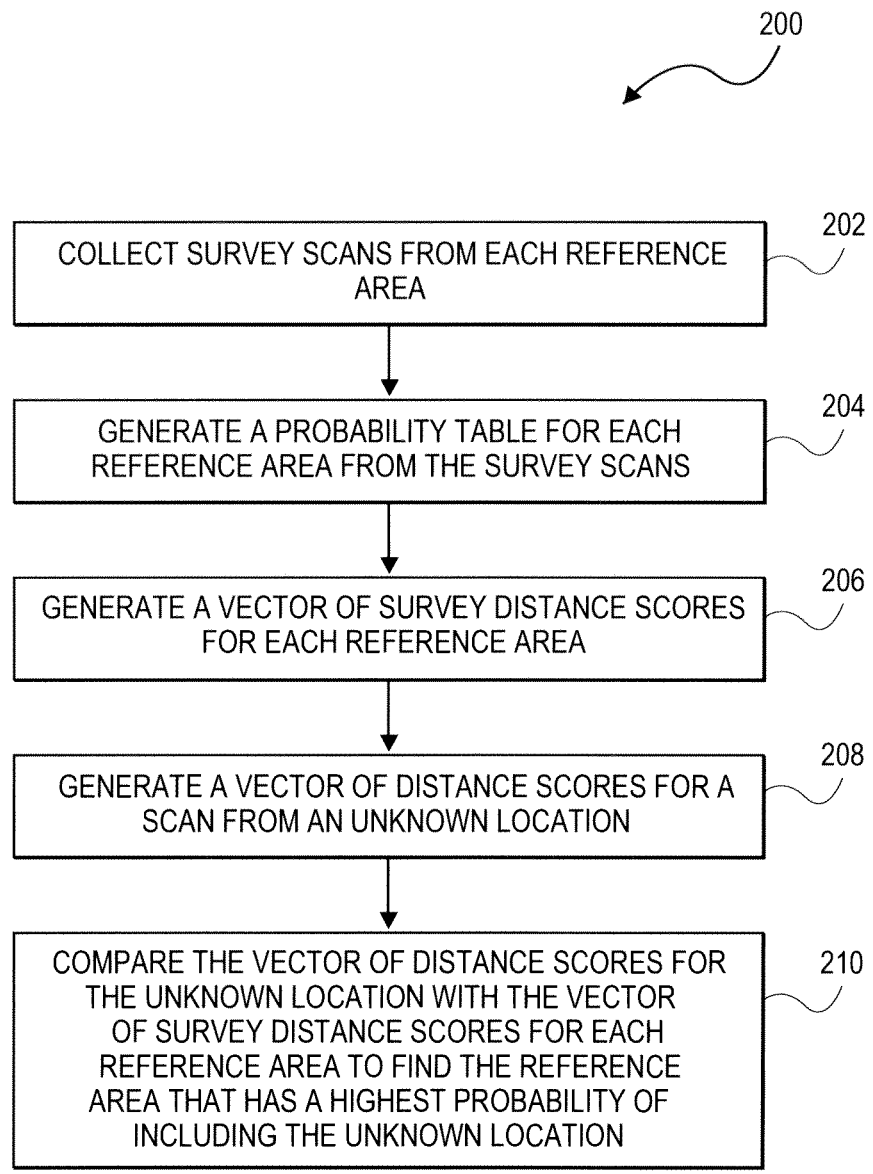
FIG. 2 is a flowchart of one embodiment of a process for implementing a semantic indoor positioning system inside a building using a plurality of reference areas as satellites.

FIG. 2 is a flowchart of one embodiment of a process for implementing a semantic indoor positioning system inside a building using a plurality of reference areas as satellites. The process is typically implemented by a computer system. The computer system can be a distributed system, where multiple computers are coupled to each other through a network and each computer performs a different part of the process. Alternatively, the computer system can be a single computer. The computer system includes at least one computer processor and at least one storage device. The computer processor can be any type of processing device including a general or central processing unit, an application specific integrated circuit (ASIC) or similar processing device. The computer processor can be connected with the storage device by a set of buses routed over a set of mainboards or similar substrates coupled to each other. Alternatively, the computer processor and the storage device can be connected through a network.

In one embodiment, the process is started by obtaining survey scans at each reference area in a building (Block 202). Each scan can be obtained by any electronic device capable of receiving radio signals transmitted by the WAPs. A WAP can transmit radio signals using any radio frequency, technology and/or standard, including Wi-Fi standards and cellular standards such as the Global System for Mobile Communications (GSM), code division multiple access (CDMA), and long-term evolution (LTE). The WAP can be any radio signal generation device, including Wi-Fi access points, regular cellular base stations, or small base stations such as femtocells which are deployed in high density indoor areas for better signal quality.

In one embodiment, the survey scans can be collected from a user if the area that the user will be in during a certain period of time is known. For example, online calendars or conference room management systems can be leveraged to determine which areas the user will be in during certain periods of time. Then, a fingerprinting application can be activated on the user's mobile device during those periods of time to obtain the survey scans. In another embodiment, when the user is actively using a network end station and the location of the end station is known or can be determined, the fingerprinting application is activated to obtain survey scans.

Two or more survey scans can be obtained at each reference area for fingerprinting. In a preferred embodiment, the same number of survey scans is obtained at each reference area. Each scan detects a number of wireless radio signals generated by the WAPs with a corresponding RSSI value for each signal. Thus, a survey scan can be expressed in a format such as $\{<WAP1, RSSI1>, <WAP2, RSSI2>, \ldots\}$.

Figure 3:
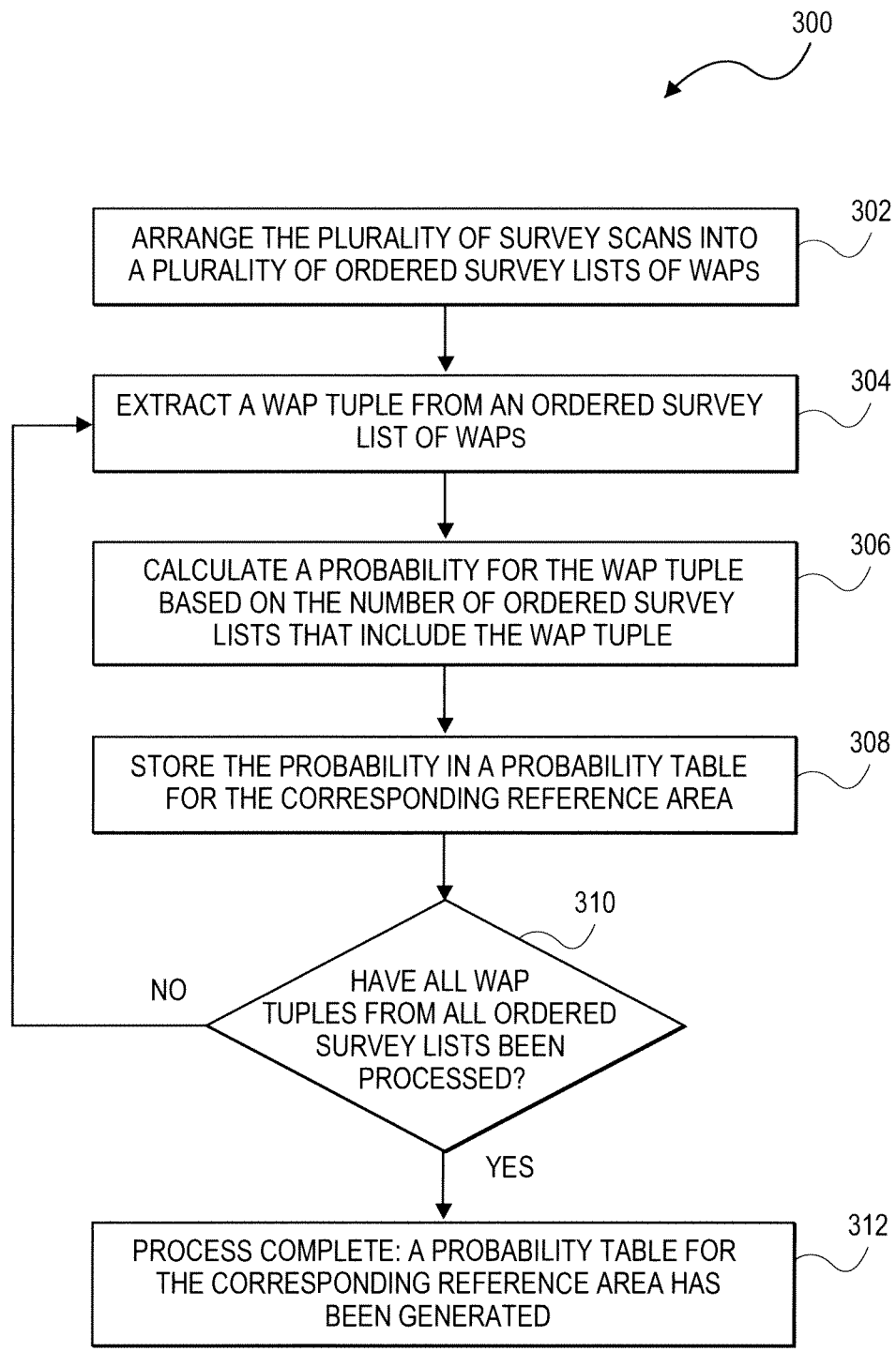
FIG. 3 is a flowchart of one embodiment of a process for generating a probability table for a reference area inside a building.

After survey scans have been collected, a probability table is generated for each reference area based on the survey scans (Block 204). Each probability table is generated from the survey scans obtained at the corresponding reference area. Each entry in a probability table includes the probability that a unique tuple of WAPs will show up in a scan obtained at the corresponding reference area after the scan has been arranged according to RSSI. The probabilities are calculated from the survey scans obtained at the corresponding reference area. The process for generating a probability table is shown in FIG. 3 and will be discussed in greater detail below.

Figure 4:
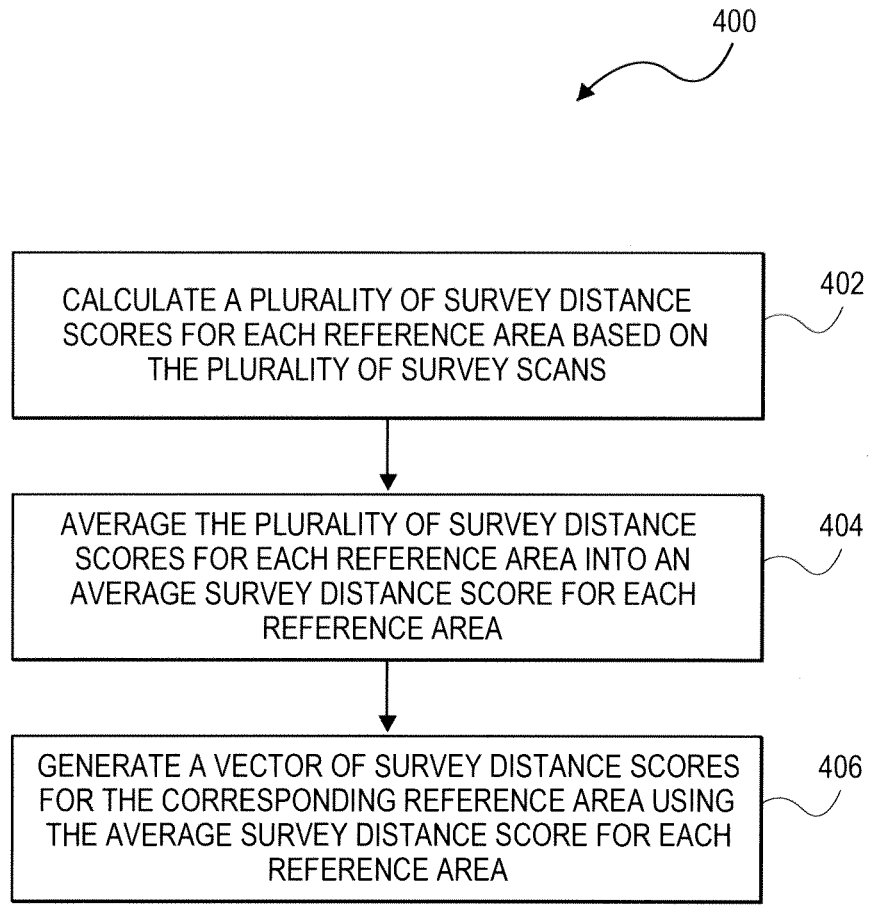
FIG. 4 is a flowchart of one embodiment of a process for generating a vector of survey distance scores for a reference area.

After generating the probability tables, a vector of survey distance scores is generated for each reference area (Block 206). In general, a vector of survey distance scores for a reference area includes each reference area in the building as a direction and an average survey distance score for each reference area as a magnitude. Each average survey distance score is calculated using the probability table for a reference area. The process for generating a vector of survey distance scores is shown in FIG. 4, which will be discussed in greater detail below. In one embodiment, the fingerprinting process is finished after the vectors of survey distance scores have been generated.

Figure 5:
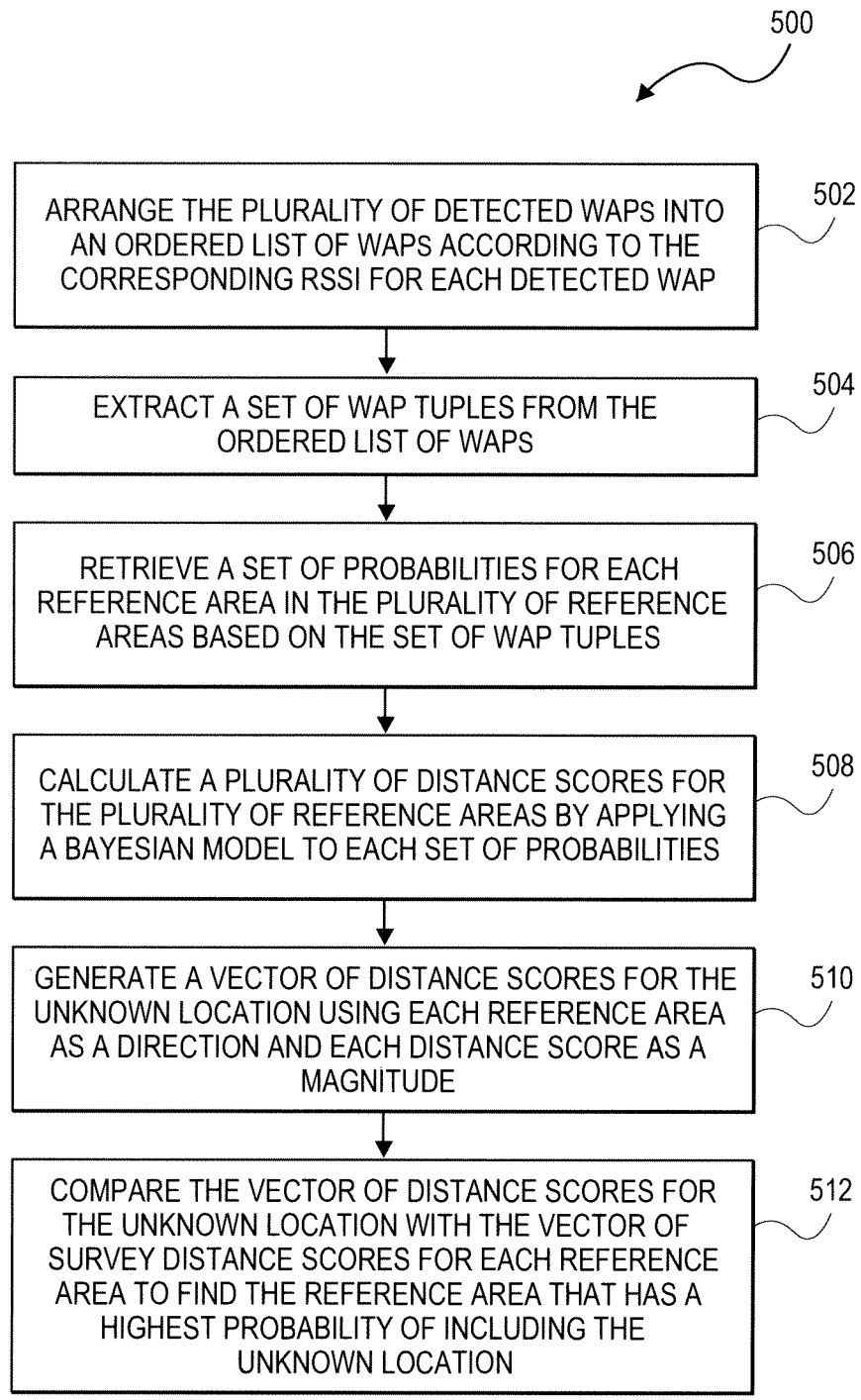
FIG. 5 is a flowchart of one embodiment of a process for locating a mobile device based on a scan obtained by the mobile device at an unknown location in a building.

Blocks 208-210 represent the process for positioning a mobile device. The mobile device obtains a new scan from an unknown location in the building. To find which reference area the mobile device is most likely to be in, a vector of distance scores is generated for the scan (Block 208). In general, a vector of distance scores includes each reference area in the building as a direction and a distance score for each reference area as a magnitude. Each distance score is calculated using the scan and the probability table for a reference area. The process for generating the vector of distance scores is shown in FIG. 5 and will be discussed in greater detail below.

The vector of distance scores for the unknown location is then compared with each of the vectors of survey distance scores that were generated for each reference area during the fingerprinting process (Block 210). Any similarity function or distance function can be used to compare the vector of distance scores for the unknown location with a vector of survey distance scores for a reference area. In a preferred embodiment, a cosine similarity function is used to compare the vector of distance scores with each vector of survey distance scores. Assuming that the vector of distance scores is represented by A, and a vector of survey distance scores for a reference area is represented by B, a cosine similarity function can be applied to the two vectors using the following equation:

$$\text{similarity} = \cos(\theta) = \frac{A \cdot B}{\|A\| \|B\|}$$

From the results of the comparison, the vector of survey distance scores that is the closest match to the vector of distance scores for the unknown location is found. In one embodiment that uses a similarity function for the comparison, the closest matching vector of survey distance scores is the vector that produces the highest result when the function is applied. In other embodiments that use distance functions, the vector of survey distance scores that produces the lowest result is the one that is the closest match to the vector of distance scores for the unknown location. In one embodiment, the closest matching vector can be found by arranging all results from the comparison according to the value of each result (e.g., descending order if a similarity function is used, and ascending order if a distance function is used). Alternatively, a search can be performed through the results to return the top result. The reference area corresponding to the vector of survey distance scores that produced the top result is the reference area that has the highest probability of including the unknown location. In some embodiments, two or more top results, and hence two or more reference areas with the highest probabilities, can be found using the same techniques.

FIG. 3 is a flowchart of one embodiment of a process for generating a probability table for a reference area inside a building. In this embodiment, it is assumed that a plurality of survey scans has already been obtained at the reference area. The process starts in this embodiment with Block 302, where each of the plurality of survey scans is arranged into an ordered survey list of WAPs according to the RSSI values. For example, a survey scan of {<A, −60>, <B, −50>, <C, −65>, <D, −70>} can be arranged into an ordered survey list such as [B, A, C, D]. Note that the RSSI values are not shown in the example ordered survey list because the values are no longer used after the scan has been arranged into the ordered survey list. Since each survey scan is arranged into an ordered survey list, this step of the process should produce the same number of ordered survey lists as the number of survey scans that were obtained at the reference area.

After all the survey scans have been arranged into ordered survey lists, a WAP tuple is extracted from an ordered survey list (Block 304). For example, if the embodiment uses 2-tuples, then the tuples <B, A>, <A, C>, and <C, D> can be extracted from the example ordered survey list of [B, A, C, D]. If the embodiment uses 3-tuples then the tuples <B, A, C> and <A, C, D> can be extracted from the example ordered survey list. In a preferred embodiment, 2-tuples are used.

Next, a probability for the extracted tuple is calculated based on the number of ordered survey lists that include the extracted tuple (Block 306). For example, if 100 survey scans are obtained from a reference area, and thus 100 ordered survey lists are generated, and if 65 of the ordered survey lists include the tuple <B, A>, then the probability for the tuple <B, A> is 65%, or 0.65.

At Block 308, the probability is stored in a probability table for the corresponding reference area. Thus, continuing with the same example, if the 100 survey scans were obtained at the first reference area 102 in FIG. 1, then the probability table for the first reference area 102 can look like Table I shown below after the first probability is stored.

TABLE I

| First Reference Area 102 | |
| --- | --- |
| Tuple | Probability |
| <B, A> | 0.65 |

At Block 310, a check is made to see if all WAP tuples in all the ordered survey lists have been processed. It should be noted that each unique WAP tuple can be processed just once, even if the tuple is included in multiple ordered survey lists, since all ordered survey lists that include the tuple are accounted for when the probability is calculated. If all WAP tuples have not been processed, then the process returns to Block 304 so that a probability for the next tuple can be calculated and stored. Once all tuples have been processed, the probability table for the corresponding reference area has been generated (Block 312). Continuing with the same example, a complete probability table for the first reference area 102 can look like Table II below.

TABLE II

| First Reference Area 102 | |
| --- | --- |
| Tuple | Probability |
| <B, A> | 0.65 |
| <A, C> | 0.30 |
| <C, D> | 0.50 |

FIG. 4 is a flowchart of one embodiment of a process for generating a vector of survey distance scores for a reference area. In this embodiment, it is assumed that a probability table has already been generated for each reference area. The process begins in this embodiment by calculating a plurality of survey distance scores for each reference area based on the survey scans obtained at a corresponding reference area (Block 402). For each survey scan, a survey distance score will be calculated for each reference area using the probability table for that reference area. In one embodiment, the survey distance score is calculated by applying a Bayesian model to the probabilities of all WAP tuples in an ordered survey list derived from a survey scan. Assuming that the probability of each tuple appearing in the ordered survey list is independent from the probabilities of the other tuples appearing in the list, a simplified version of the Bayesian model can be applied by taking the product of the probabilities of all tuples in the list.

To assist with the understanding of how survey distance scores are calculated, an example calculation is now described. Assume that Table III shown below represents the probability tables that have been generated for the reference areas in FIG. 1.

TABLE III

| First Reference Area 102 | | Second Reference Area 104 | | Third Reference Area 106 | |
| --- | --- | --- | --- | --- | --- |
| Tuple | Probability | Tuple | Probability | Tuple | Probability |
| <B, A> | 0.65 | <B, A> | 0.45 | <B, A> | 0.90 |
| <A, C> | 0.30 | <A, C> | 0.40 | <A, C> | 0.80 |
| <C, D> | 0.50 | <C, D> | 0.15 | <C, D> | 0.20 |

TABLE III-continued

| | Fourth Reference Area 108 | | Fifth Reference Area 110 | |
|---|---|---|---|---|
| | Tuple | Probability | Tuple | Probability |
| | <B, A> | 0.85 | <B, A> | 0.70 |
| | <A, C> | 0.70 | <A, C> | 0.55 |
| | <C, D> | 0.45 | <C, D> | 0.65 |

The survey distance scores for the example survey scan {A, −60>, <B, −50>, <C, −65>, <D, −70>} obtained from the first reference area 102 are calculated by arranging the scan into an ordered survey list and extracting WAP tuples from the list. This can be accomplished using the same process described above for generating the probability tables, which produced the ordered survey list [B, A, C, D] with the tuples <B, A>, <A, C>, and <C, D>. Then, the probability of each tuple is retrieved from the probability table for the first reference area 102. To calculate the survey distance score for the first reference area 102, the three probabilities are multiplied together as follows: distance score=Pr(<B, A>)*Pr(<A, C>)*Pr(<C, D>)=0.65*0.30*0.50=0.0975. This calculation is repeated using the probability table for each reference area, producing the survey distance scores shown below in Table IV for this example survey scan.

TABLE IV

| | First Reference Area 102 | Second Reference Area 104 | Third Reference Area 106 | Fourth Reference Area 108 | Fifth Reference Area 110 |
|---|---|---|---|---|---|
| Distance Score | 0.0975 | 0.027 | 0.144 | 0.26775 | 0.25025 |

This process is then repeated for each survey scan, thus the total number of survey distance scores calculated is equal to the number of reference areas multiplied by the number of survey scans.

At block 404, the plurality of survey distance scores for each reference area are averaged into an average survey distance score. The averaging can be done by adding the survey distance scores together and then dividing by the number of survey scans. As a simplified example, assume that only two survey scans were obtained from the first reference area 102. The survey distance scores calculated from each survey scan and the resulting average survey distance scores are shown below in Table V.

TABLE V

| | First Reference Area 102 | Second Reference Area 104 | Third Reference Area 106 | Fourth Reference Area 108 | Fifth Reference Area 110 |
|---|---|---|---|---|---|
| Distance Score 1 | 0.0975 | 0.027 | 0.144 | 0.26775 | 0.25025 |
| Distance Score 2 | 0.083 | 0.0443 | 0.205 | 0.2863 | 0.1987 |
| Avg. Distance Score | 0.09025 | 0.03565 | 0.1745 | 0.277025 | 0.224475 |

Using the average survey distance scores, a vector of survey distance scores can be generated for the reference area corresponding to where the survey scans were obtained from (Block 406). The vector is generated by using each reference area as a direction and each average survey distance score as a magnitude. Thus, using the example average survey distance scores shown above for survey scans obtained at the first reference area 102, the vector of survey distance scores for the first reference area 102 can look like the following: <RA1: 0.09025, RA2: 0.03565, RA3: 0.1745, RA4: 0.277025, RA5: 0.224475>.

FIG. 5 is a flowchart of one embodiment of a process for locating a mobile device based on a scan obtained by the mobile device at an unknown location in a building. In this embodiment, the process starts by arranging the plurality of detected WAPs from the scan into an ordered list of WAPs according to the RSSI (Block 502). This is done the same way as described above with reference to FIG. 3 for arranging survey scans into ordered survey lists. Next, a set of WAP tuples is extracted from the ordered list of WAPs (Block 504). This is also done the same way as described above for extracting WAP tuples from an ordered survey list.

After extracting the set of WAP tuples, a set of probabilities corresponding to the set of WAP tuples is retrieved for each reference area (Block 506). Thus, a probability is retrieved for each tuple from each probability table. Then, a distance score is calculated for each reference area using the set of probabilities that was retrieved for the corresponding reference area (Block 508). Each distance score is calculated in the same manner as described above with reference to FIG. 4 for calculating survey distance scores, which is by calculating the product of a set of probabilities. Thus, after Block 508, a distance score will have been calculated for each reference area.

A vector of distance scores is then generated using the distance score that was calculated for each reference area (Block 510). This is done the same way as described above with reference to FIG. 4 for generating a vector of survey distance scores. Thus, each reference area is a direction in the vector of distance scores and each distance score is a magnitude in the vector of distance scores. At Block 512, the vector of distance scores for the unknown location is compared with the vector of survey distance scores for each reference area to find the reference area that has the highest probability of including the unknown location. As noted above, any similarity function or distance function can be used to perform each comparison. The reference area corresponding to the vector of survey distance scores that is the closest match to the vector of distance scores for the unknown location is the most probable reference area.

In one embodiment, multiple scans can be obtained at the unknown location to improve accuracy. To position the mobile device, a vector of distance scores is generated for each scan. Then, the vectors of distance scores can be averaged together into a vector of average distance scores for the unknown location. The averaging can be performed using the same process described above for generating a vector of survey distance scores. The vector of average distance scores can then be compared with each of the vectors of survey distance scores using any of the embodiments described above.

In another embodiment, instead of just finding the reference area that has the highest probability of including the unknown location, the coordinates of the unknown location can be estimated from the generated vector of distance scores using techniques such as interpolation. If the coordinates of each reference area in a building is known, then the coordinates of the unknown location can be interpolated. The coordinates of each reference area can represent the center of the reference area, a bounding rectangle (with two corner points), or a bounding circle (with center and radius). For example, if the coordinates of each reference area represents the point at the center of the reference area, the vector of distance scores for the unknown location can be expressed as <$p_1$: $score_1$, $p_2$: $score_2$, ... $p_k$: $score_k$, ... $p_n$: $score_n$>, where each $p_k$ represents the point at the center of a reference area. Then, the point of the unknown location, represented as p, can be estimated by taking the weighted average of all distance scores in the vector of distance scores (i.e., by summing up the product of each point multiplied by its distance score and then dividing the sum by the total of all distance scores), as represented in the following equation:

$$p = \frac{\sum_{k=1}^{n} p_k * score_k}{\sum_{k=1}^{n} score_k}$$

Figure 6:
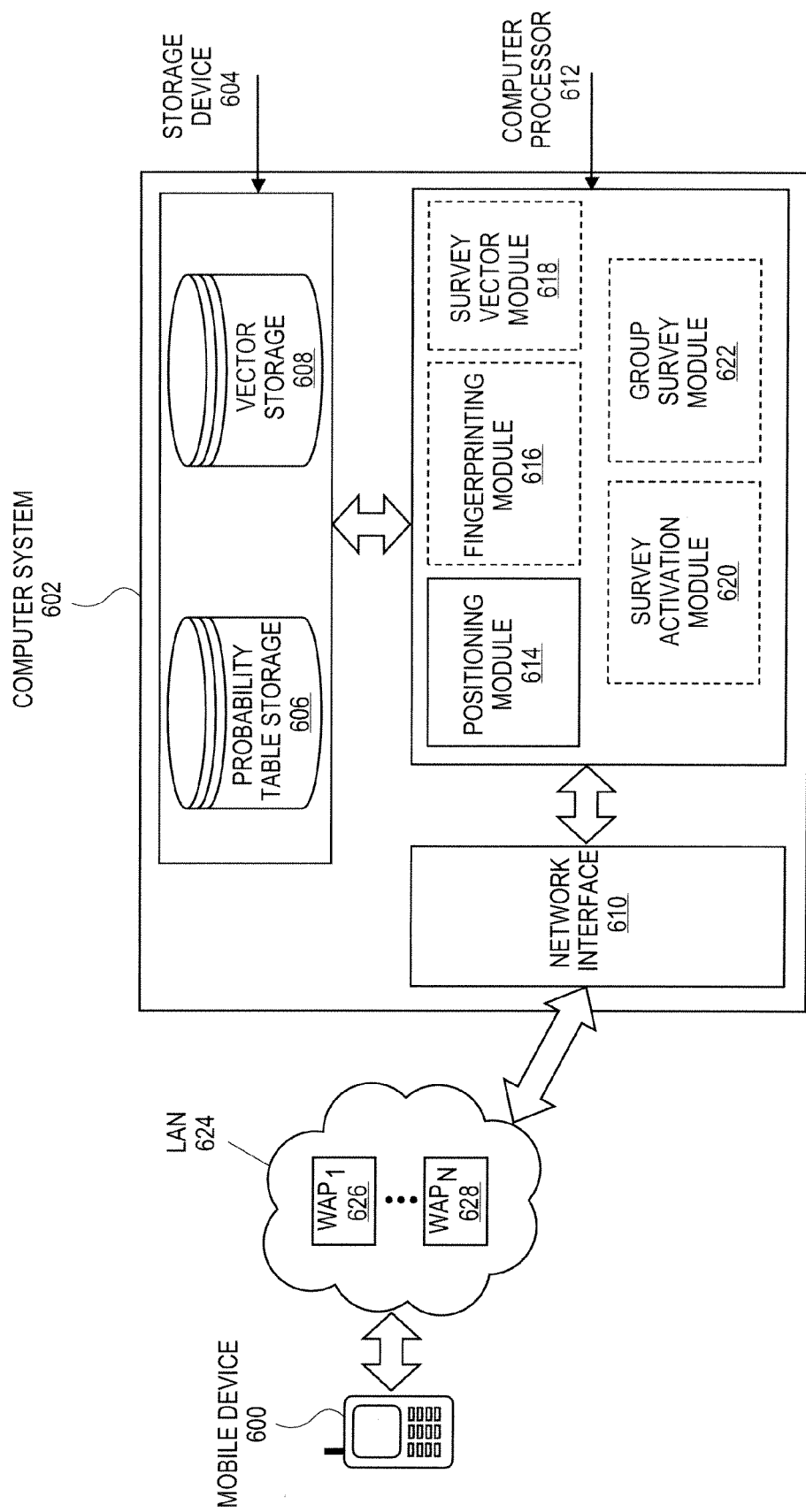
FIG. 6 is a diagram of one example embodiment of a computer system implementing a semantic indoor positioning system that uses a plurality of reference areas inside a building as satellites.

FIG. 6 is a diagram of one example embodiment of a computer system implementing a semantic indoor positioning system that uses a plurality of reference areas inside a building as satellites. The system includes mobile device 600 and computer system 602. In this embodiment, mobile device 600 communicates with computer system 602 through local area network (LAN) 624. LAN 624 can include any number of WAPs 626-628. Each WAP 626-628 can be any radio signal generation device, including Wi-Fi access points or small cellular base stations such as femtocells, which are deployed in high density indoor areas for better cellular signal quality. Mobile device 600 can be any electronic device capable of communicating wirelessly with a WAP through any radio technology or standard, including Wi-Fi standards and cellular standards such as GSM, CDMA, and LTE. Computer system 602 includes network interface 610 for communicating with LAN 624. Network interface 610 can be a wired interface or a wireless interface.

Computer system 602 can be a distributed system, where multiple computers are coupled to each other through a network and each computer performs a different part of the process. Alternatively, computer system 602 can be a single computer. Computer system 602 includes a storage device 604 configured to store a probability table storage 606 and a vector storage 608. In one embodiment, storage device 604 can be located in mobile device 600. Furthermore, storage device 604 can be implemented on any number of physical storage devices, including having a portion of storage device 604 being located in mobile device 600 and a portion located in computer system 602.

Computer system 602 also includes computer processor 612. Computer processor 612 can be any type of processing device including a general or central processing unit, an application specific integrated circuit (ASIC) or similar processing device. Computer processor 612 can be connected with storage device 604 and network interface 610 by a set of buses routed over a set of mainboards or similar substrates coupled to each other. Alternatively, computer processor 612 and storage device 604 can be connected through a network. In one embodiment, computer processor 612 can be located in mobile device 600. Alternatively, computer processor 612 can be implemented on multiple processors, including having some modules implemented on a processor in mobile device 600 and some modules implemented in computer system 602.

Computer processor 612 implements positioning module 614. Mobile device 600 obtains a scan at an unknown location in a building such as the one depicted in FIG. 1. The scan is transmitted to computer system 602 through LAN 624. Network interface 610 receives the scan from LAN 624 and transmits the scan to computer processor 612 for processing. Positioning module 614 finds a reference area that has the highest probability of including the unknown area using any of the embodiments described herein.

In some embodiments, computer processor 612 also implements fingerprinting module 616, survey vector module 618, survey activation module 620, and group survey module 622. Fingerprinting module 616 is configured to generate a probability table for each reference area based on a plurality of survey scans using any of the embodiments described herein and store the probability tables in probability table storage 606. Survey vector module 618 is configured to generate a vector of survey distance scores for each reference area using the survey scans and the probability tables and store the vectors of survey distance scores in vector storage 608.

In one embodiment, survey activation module 620 is configured to leverage online calendars or conference room management systems to determine which reference area mobile device 600 will be in during a certain period of time. Then, survey activation module 620 can activate a program on mobile device 600 during that period of time to obtain the survey scans. The activation can be performed by transmitting a command to mobile device 600 through network interface 610 and LAN 624. In another embodiment, when the user of mobile device 600 is actively using a network end station and the location of the end station is known or can be determined, survey activation module 620 activates the program to obtain the survey scans.

Group survey module 622 is configured to generate vectors of group survey distance scores for a building. When there are a large number of reference areas in a building, the reference areas can be organized into a hierarchy to optimize processing speed and accuracy. For example, consider a building with 1024 reference areas. At the highest level, the reference areas can be divided into four macro-areas with 256 reference areas in each. The survey scans obtained at each of the macro-area's constituent reference areas can be aggregated and group survey module 622 can generate a vector of group survey distance scores for each macro-area using any of the embodiments described herein on the aggregated survey scans. When determining the location of a scan, the positioning process can be performed a first time to determine which one of the four macro-areas mobile device 600 is located in. Furthermore, each macro-area can be divided into four micro-areas, each with 64 reference areas, and the positioning process can be performed a second time to determine which micro-area mobile device 600 is located in. This can be repeated until it is narrowed down to one or two reference areas to locate mobile device 600 with high accuracy. This can result in a drastic decrease in computational costs and accordingly a saving in response time and power consumption.

Figure 7:
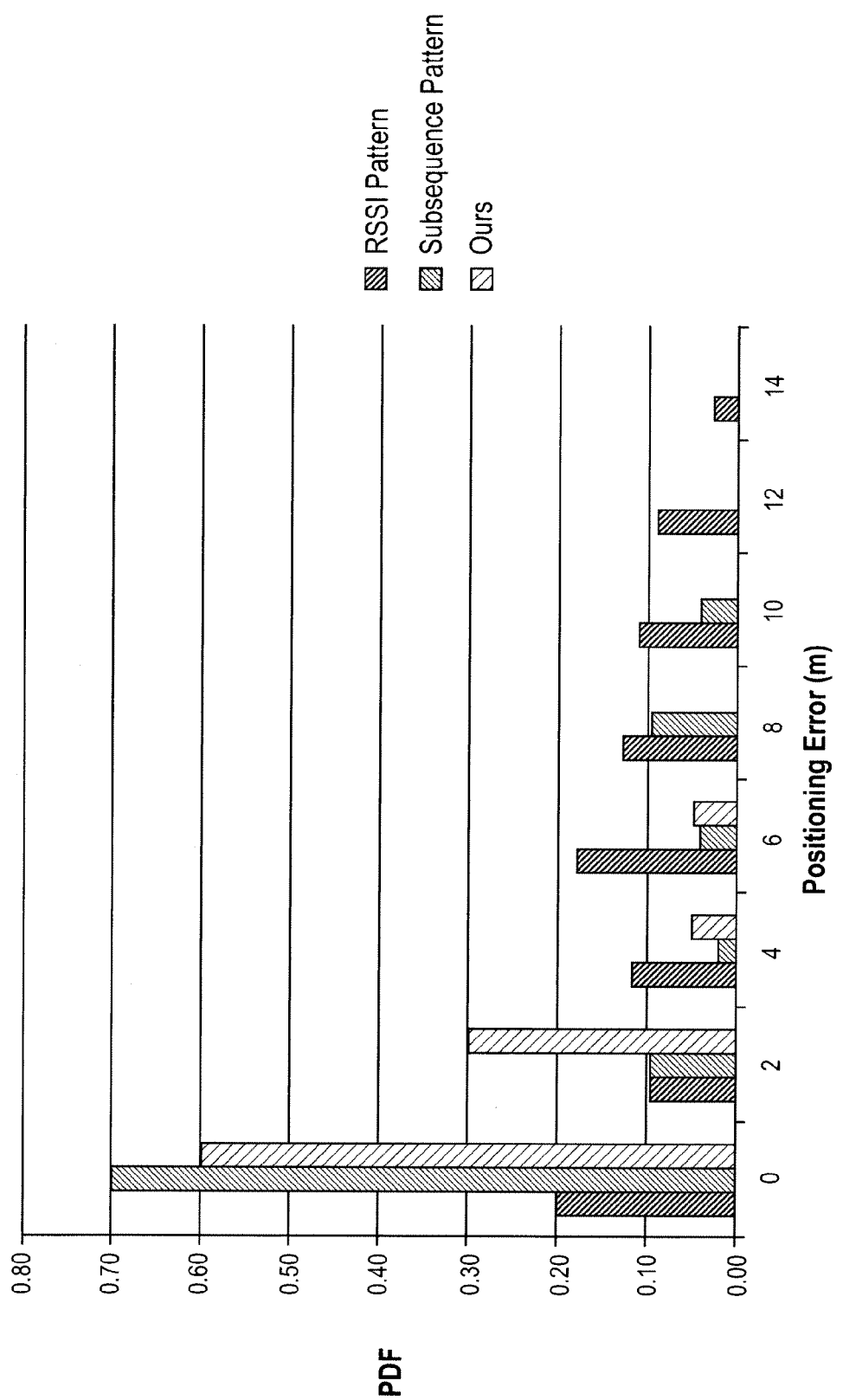
FIG. 7 is a graph showing experimental results that compare the accuracy of one embodiment of a semantic indoor positioning process that uses a plurality of reference areas as satellites with two competing approaches.

FIG. 7 is a graph showing experimental results that compare the accuracy of one embodiment of a semantic indoor positioning process that uses a plurality of reference areas as satellites with two competing approaches: the RSSI pattern based statistical approach and the subsequence pattern based statistical approach. The experiments were focused on open cubicle areas inside a building since the subsequence pattern based approach already achieved sufficient accuracy of over 90% for wall-separated rooms. The cubicle reference areas used in these experiments each has dimensions of approximately 2×2 meters. Hence the distance between the centers of two neighboring cubicle reference areas is about 2 meters. A positioning error of 2 meters means the method makes a wrong prediction by one cubicle.

As shown in FIG. 7, the results from the RSSI pattern based approach are pretty random with very low accuracy. The subsequence pattern based approach achieves high accuracy of 70% in the right cubicle. However, its predictions could randomly drift by 1-5 cubicles. Our experiment results from using one of the embodiments described herein are slightly lower in accuracy than the subsequence pattern based approach by approximately 10%. However, the drifting of our results is tightly bound by one neighboring cubicle. That is, the result from using one of the embodiments described herein falls in the right cubicle or its immediate neighbor more often than the subsequence pattern based approach.

As FIG. 7 shows, the subsequence pattern based approach achieves 70% accuracy in the cubicle and 10% within immediately neighboring cubicles, implying that it can achieve 80% accuracy within a 2-meter margin of error. The embodiments described herein achieve 60% accuracy with 0-meter error and 30% accuracy with 2-meter error, implying a 90% accuracy within a 2-meter margin of error. This is the desired accuracy for some applications, such as smart energy systems that detect occupancy of HVAC and lighting zones.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method executed by a computer system implementing a semantic indoor positioning system, the semantic indoor positioning system to locate a mobile device inside a building by using a plurality of reference areas as satellites, where the building includes the plurality of reference areas, where a scan of a plurality of wireless radio signals is obtained by the mobile device of a user at an unknown location in the building, where the plurality of wireless radio signals is generated by a plurality of wireless access points (WAPs), where the scan includes a plurality of detected WAPs with a corresponding received signal strength indication (RSSI) for each detected WAP in the plurality of detected WAPs, the method to improve accuracy of the semantic indoor positioning system by generating a vector of distance scores for the unknown location based on the scan for comparison with a plurality of vectors of survey distance scores corresponding to the plurality of reference areas, the method comprising the steps of:

arranging the plurality of detected WAPs into an ordered list of WAPs according to the corresponding RSSI for each detected WAP in the plurality of detected WAPs;

extracting a set of WAP tuples from the ordered list of WAPs, wherein each WAP tuple in the set of WAP tuples includes a preset number of adjacent WAPs from the ordered list;

retrieving a set of probabilities for each reference area in the plurality of reference areas based on the set of WAP tuples, wherein each probability in the set of probabilities for a corresponding reference area is calculated from a plurality of survey scans obtained at the corresponding reference area;

calculating a plurality of distance scores for the plurality of reference areas, wherein each distance score in the plurality of distance scores is calculated by applying a Bayesian model to the retrieved set of probabilities for the corresponding reference area;

generating the vector of distance scores for the unknown location using each reference area in the plurality of reference areas as a direction and each distance score in the plurality of distance scores as a magnitude; and comparing the vector of distance scores for the unknown location with each of the plurality of vectors of survey distance scores to find the reference area that has a highest probability of including the unknown location.

2. The method of claim 1, further comprising the steps of:
arranging the plurality of survey scans into a plurality of ordered survey lists of WAPs;
extracting a WAP tuple from an ordered survey list in the plurality of ordered survey lists;
calculating a probability for the WAP tuple based on a number of ordered survey lists in the plurality of ordered survey lists that include the WAP tuple; and
storing the probability in a probability table for the corresponding reference area.

3. The method of claim 1, further comprising the steps of:
calculating a plurality of survey distance scores for each reference area based on the plurality of survey scans;
averaging the plurality of survey distance scores for each reference area into an average survey distance score for each reference area; and
generating a vector of survey distance scores for the corresponding reference area using the average survey distance score for each reference area.

4. The method of claim 1, further comprising the step of:
applying at least one of a similarity function and a distance function to the vector of distance scores for the unknown location and a vector of survey distance scores.

5. The method of claim 1, further comprising the steps of:
receiving a second scan obtained at the unknown location from the mobile device;
generating a second vector of distance scores for the unknown location from the second scan;
averaging the vector of distance scores for the unknown location and the second vector of distance scores for the unknown location into a vector of average distance scores for the unknown location; and
comparing the vector of average distance scores for the unknown location with the plurality of vectors of survey distance scores.

6. The method of claim 1, further comprising the steps of:
dividing the plurality of reference areas into a plurality of reference area groups;
aggregating the plurality of survey scans obtained at each reference area in a reference area group into a plurality of group survey scans;
generating a vector of group survey distance scores from the plurality of group survey scans; and
comparing the vector of distance scores for the unknown location with the vector of group survey distance scores.

7. The method of claim 1, further comprising the step of:
interpolating a coordinate for the unknown location using a plurality of results from the comparison.

8. The method of claim 1, further comprising the steps of:
determining a location of the user based on a schedule; and
activating a program on the mobile device of the user to obtain the plurality of survey scans.

9. The method of claim 1, further comprising the steps of:
determining a location of the user based on the user activating a network end station; and
activating a program on the mobile device of the user to obtain the plurality of survey scans.

10. A computer system implementing a semantic indoor positioning system, the semantic indoor positioning system to locate a mobile device inside a building by using a plurality of reference areas as satellites, wherein the building includes the plurality of reference areas, wherein a scan of a plurality of wireless radio signals is obtained by the mobile device of a user at an unknown location in the building, wherein the plurality of wireless radio signals is generated by a plurality of wireless access points (WAPs), wherein the scan includes a plurality of detected WAPs with a corresponding received signal strength indication (RSSI) for each detected WAP in the plurality of detected WAPs, the computer system to improve accuracy of the semantic indoor positioning system by generating a vector of distance scores for the unknown location based on the scan for comparison with a plurality of vectors of survey distance scores corresponding to the plurality of reference areas, the computer system comprising:

a storage device configured to store a probability table storage and a vector storage,
the probability table storage configured to store a plurality of probability tables corresponding to the plurality of reference areas, wherein each probability in a probability table is calculated from a plurality of survey scans obtained at a corresponding reference area, and
the vector storage configured to store the plurality of vectors of survey distance scores; and
a computer processor coupled to the storage device and configured to execute a positioning module,
the positioning module configured to arrange the plurality of detected WAPs into an ordered list of WAPs according to the corresponding RSSI for each detected WAP in the plurality of detected WAPs, to extract a set of WAP tuples from the ordered list of WAPs, each WAP tuple in the set of WAP tuples including a preset number of adjacent WAPs from the ordered list, to retrieve a set of probabilities from the probability table storage for each reference area in the plurality of reference areas based on the set of WAP tuples, to calculate a plurality of distance scores for the plurality of reference areas, each distance score in the plurality of distance scores being calculated by applying a Bayesian model to the retrieved set of probabilities for the corresponding reference area, to generate the vector of distance scores for the unknown location using each reference area in the plurality of reference areas as a direction and each distance score in the plurality of distance scores as a magnitude, and to compare the vector of distance scores for the unknown location with each of the plurality of vectors of survey distance scores to find the reference area that has a highest probability of including the unknown location.

11. The computer system of claim 10, wherein the computer processor is further configured to execute a fingerprinting module configured to arrange the plurality of survey scans into a plurality of ordered survey lists of WAPs, to extract a WAP tuple from an ordered survey list in the plurality of ordered survey lists, to calculate a probability for the WAP tuple based on a number of ordered survey lists in the plurality of ordered survey lists that include the WAP tuple, and to store the probability in the probability table for the corresponding reference area in the probability table storage.

12. The computer system of claim 10, wherein the computer processor is further configured to execute a survey vector module configured to calculate a plurality of survey distance scores for each reference area based on the plurality of survey scans, to average the plurality of survey distance scores for each reference area into an average survey distance score for each reference area, to generate a vector of survey distance scores for the corresponding reference area using the average survey distance score for each reference area, and to store the vector of survey distance scores for the corresponding reference area in the vector storage.

13. The computer system of claim 10, wherein the positioning module is further configured to apply at least one of a similarity function and a distance function to the vector of distance scores for the unknown location and a vector of survey distance scores.

14. The computer system of claim 10, wherein the positioning module is further configured to receive a second scan obtained at the unknown location from the mobile device, to generate a second vector of distance scores for the unknown location from the second scan, to average the vector of distance scores for the unknown location and the second vector of distance scores for the unknown location into a vector of average distance scores for the unknown location, and to compare the vector of average distance scores for the unknown location with the plurality of vectors of survey distance scores.

15. The computer system of claim 10, wherein the plurality of reference areas are divided into a plurality of reference area groups, wherein the computer processor is further configured to execute a group survey module configured to aggregate the plurality of survey scans obtained at each reference area in a reference area group into a plurality of group survey scans, to generate a vector of group survey distance scores from the plurality of group survey scans, and to store the vector of group survey distance scores in the vector storage, and wherein the positioning module is further configured to compare the vector of distance scores for the unknown location with the vector of group survey distance scores.

16. The computer system of claim 10, wherein the positioning module is further configured to interpolate a coordinate for the unknown location using a plurality of results from the comparison.

17. The computer system of claim 10, wherein the computer processor is further configured to execute a survey activation module configured to determine a location of the user based on a schedule, and to activate a program on the mobile device of the user to obtain the plurality of survey scans.

18. The computer system of claim 10, wherein the computer processor is further configured to execute a survey activation module configured to determine a location of the user based on the user activating a network end station, and to activate a program on the mobile device of the user to obtain the plurality of survey scans.

* * * * *